J. D. HUMPHREYS.
STEAM ENGINE GOVERNOR.

No. 40,754. Patented Dec. 1, 1863.

Witnesses:
J. Burnham
D. Jones Crain

Inventor:
John D. Humphreys
by his Atty
Wm Kemble Hall

UNITED STATES PATENT OFFICE.

JOHN D. HUMPHREYS, OF LONDON, ENGLAND.

IMPROVEMENT IN STEAM-ENGINE GOVERNERS.

Specification forming part of Letters Patent No. 40,754, dated December 1, 1863.

*To all whom it may concern:*

Be it known that I, JOHN D. HUMPHREYS, of the city of London, in the Kingdom of Great Britian, have invented a new and useful Improvement in Steam-Engine Governors; and I do hereby declare that the following is a full, clear, and exact description of the same, reference being had to the accompanying drawings, making a part of this specification, and to the letters of reference marked thereon.

The object of my invention is to regulate the admission of steam to an engine in such a manner that any variation of its volocity will open or close the throttle-valve, as the case may require, to restore the required speed. For this purpose I connect the throttle-valve with the collar of a loose sleeve, which is rotated by means of a pulley driven by a band from the engine to be governed, and which is controlled in a longitudinal direction by a screw placed on its shaft and driven at a uniform rate by a supplementary engine in such a manner that while the main engine is working regularly and in unison with the supplementary engine the relative position of the screw and the sleeve remains unchanged, but when any variation takes place in the rotation of the two engines the corresponding variation of the screw and the sleeves causes the longitudinal movement of the latter to be transferred to the valve.

The operation of my invention may be compared to a screw bolt and nut, which retain their position relatively to each other unchanged, while they are both rotated together, but as soon as one is rotated faster than the other a longitudinal movement is occasioned, which is used in my machine for the purpose of acting upon the throttle-valve to correct the disturbance of the motion by the admission of more or less steam. In addition to these parts analogous to those of my machine which I have mentioned, it is necessary to supply a fly-wheel for the purpose of securing uniformity of motion and also some special means of imparting rotary motion to the sleeve in such a way that it will not interfere with the longitudinal motion on its shaft which is used to work the valve.

To enable others skilled the arts to which it appertains to make and use my invention, I will proceed to describe its construction and operation with reference to the drawings.

Figure 1:
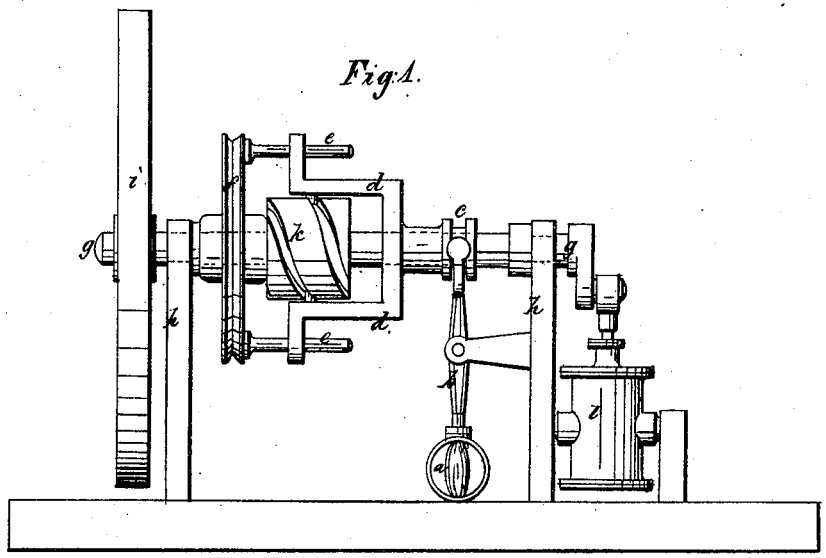
Figure 2:
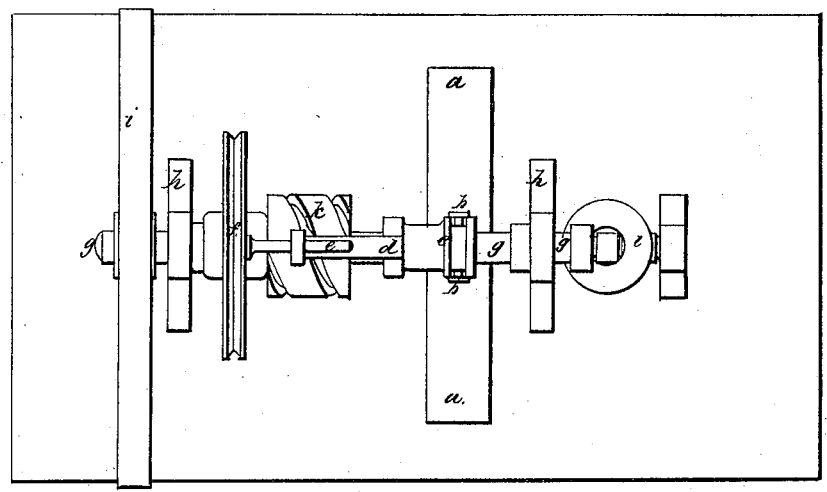

Figure 1 is an elevation of my improved governing apparatus, and Fig. 2 is a plan of the same.

The steam-pipe $a$ of the engine to be governed contains a throttle-valve operated by the lever $b$, which is constructed with a fork at its upper end working between the collars of the loose sleeve $c$. This sleeve has two arms, $d$, with lugs at their ends, through which pass the rods $e$, projecting from the loose pulley $f$, so that while the sleeve and the pulley must necessarily revolve together, they may diverge or approach within the limits of the machine a distance sufficient to open and close the valve to which the governor is connected. The loose sleeve and pulley are both mounted upon the shaft $g$, which is sustained in the bearings $h$, and is furnished with a fly-wheel, $i$, and a cylinder, $k$, with a pair of threads cut into its surface for the reception of pins from the arms $d$ of the loose sleeve. This shaft $g$ is rotated by means of the engine $l$. The loose pulley is mounted on a wide hub, which is confined to its place on the shaft by the screw-cylinder on one side and a collar on the other, so that it can have no other than a rotary motion, and therefore, when the pulley is turned by the main engine faster or slower than the screw-cylinder is turned by the supplementary engine, the spiral grooves of the latter cause the sleeve to advance or recede on the shaft, and to close or open the throttle-valve by means of the lever $d$, as may be required.

It is obvious that the apparatus I have described may be modified in appearance without departure from the principle of its construction. Instead of rotating the sleeve by means of a pulley, it may be made in one piece with a toothed wheel which slides along the shaft with the sleeve and works into corresponding gearing connected with the engine; and also, when it may be desirable for the sake of convenience in applying the machine, the fly-wheel, instead of being keyed to the shaft as above stated, may be attached to the pulley, in which case the supplementary engine should drive the pulley and the main engine drive the shaft.

What I claim as my invention is—

A governor for regulating the speed of marine or other engines, consisting of an independent or separately-working engine, in combination with a fly-wheel, said governing apparatus operating in a manner substantially as herein described.

JOHN D. HUMPHREYS.

Witnesses:
FRED. BROOKER,
SIEGMUND STRIEMER,
    *Both of 10 Birchin Lane.*